United States Patent [19]

Thoreau

[11] Patent Number: 4,903,128

[45] Date of Patent: Feb. 20, 1990

[54] METHOD AND DEVICE FOR THE REDUCTION OF NOISE GENERATED BY A DIGITAL IMAGE ENCODER/DECODER OPERATING BY BLOCKS

[75] Inventor: Dominique Thoreau, Rennes, France

[73] Assignee: Thomson Grand Public, Paris, France

[21] Appl. No.: 221,453

[22] PCT Filed: Oct. 28, 1987

[86] PCT No.: PCT/FR87/00425

§ 371 Date: Aug. 25, 1988

§ 102(e) Date: Aug. 25, 1988

[87] PCT Pub. No.: WO88/03346

PCT Pub. Date: May 5, 1988

[30] Foreign Application Priority Data

Oct. 31, 1986 [FR] France ............................... 8615242

[51] Int. Cl.$^4$ .................. H04N 5/208; H04N 5/21
[52] U.S. Cl. .................................. 358/167; 358/166; 358/340
[58] Field of Search ............... 358/167, 36, 160, 166, 358/96, 22, 106, 163, 282, 284, 339, 340, 336

[56] References Cited

U.S. PATENT DOCUMENTS

| | | | |
|---|---|---|---|
| 4,392,123 | 7/1983 | Bruggemann | 358/167 |
| 4,566,126 | 1/1986 | Miyagawa | 358/22 |
| 4,729,019 | 3/1988 | Rouvrris | 358/167 |
| 4,794,454 | 12/1988 | Sugiyama | 358/167 |

FOREIGN PATENT DOCUMENTS 2329124 5/1977 France .

OTHER PUBLICATIONS

ICASSP 83 Proceddings on the IEEE International Conference on Acoustics, Speed and Signal Processing, 14–16 Apr. 1983, Boston, MA., IEEE Acoustics, Speed & Signal Processing Society, vol. 3, (US) H. C. Reeve III et al.:"Reduction of Blocking ... " pp. 1212 & 1213.
IEEE International Conference on Communications, 13–17, Jun. 1982, Philadelphia, Conference Record, vol. 2 of 3, ICC'82, The Digital Revolution, IEEE, (US), R. C. Reininger et al.:"Soft Decision Demodulation and Transform coding of Images", pp. 4H.3.1–4H.3.6.
International Conference on Communications, ICC'80, Conference Record; (8–12 Jun. 1980, vol. 2 of 3, Seattle, WA, US) King Ngi Ngan et al.: "Lowpass Filtering in the Cosine Transform Domain", pp. 31.7.3 Left Hand Column, Line 6, p. 31.7.4 Left Hand Column.

Primary Examiner—Tommy P. Chin
Attorney, Agent, or Firm—Oblon, Spivak, McClelland, Maier & Neustadt

[57] ABSTRACT

Disclosed is a method for the reduction of the noise generated during the encoding/decoding of digitized images operating by blocks. To reduce the faults visible in the restored image, the method consists in filtering the image by using a filtering window, for example with dimensions of 3×3 pixels, which scans the image, the current point being the central point of this window, and in determining, for each point, the mean of the values associated wih the points of this window, and in determining for the current point, from this mean and from a characteristic value of the operating status of the encoder, a filtering parameter which can be used to determine the filtered value associated with the current point. The invention can be applied to the resutitution of block encoded images especially in digitalized video tape-recorders.

7 Claims, 4 Drawing Sheets

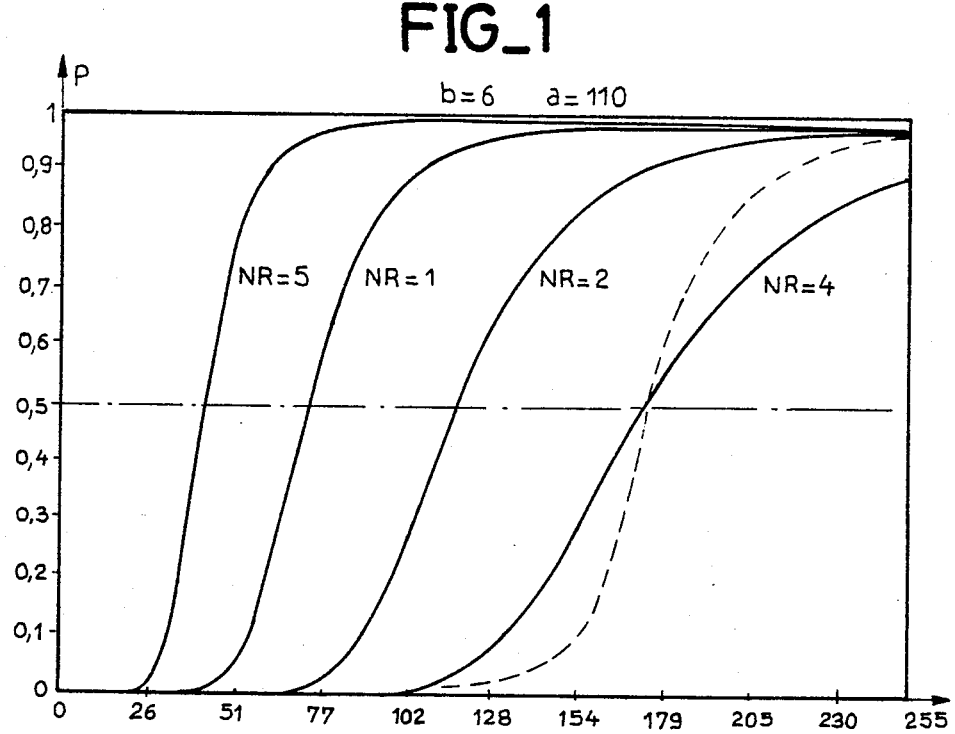
FIG_1
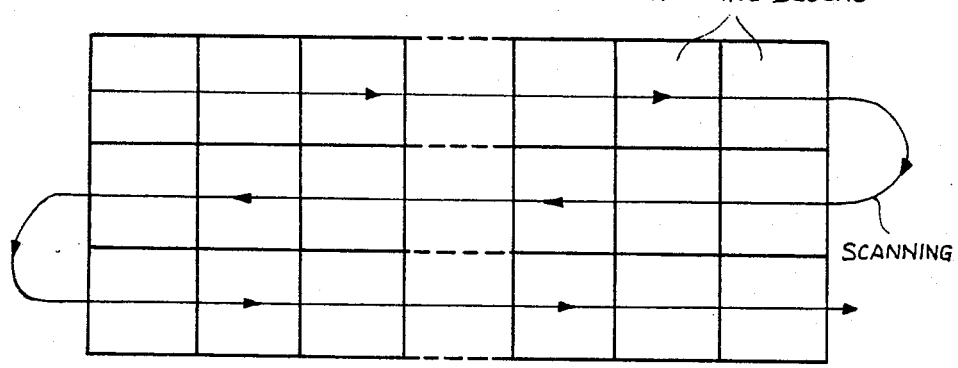
FIG_2

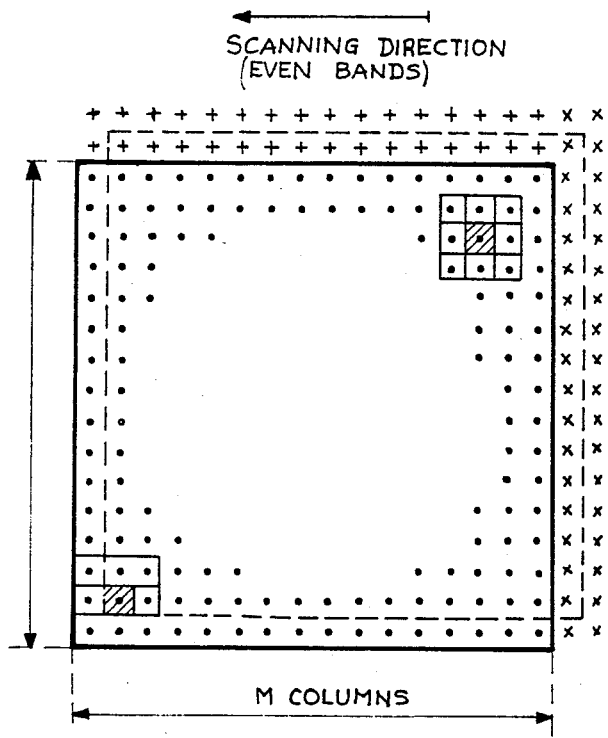
FIG_3
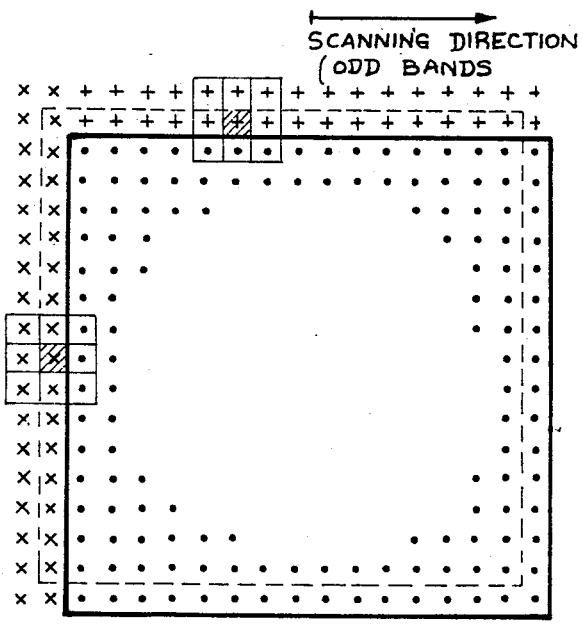
FIG_4

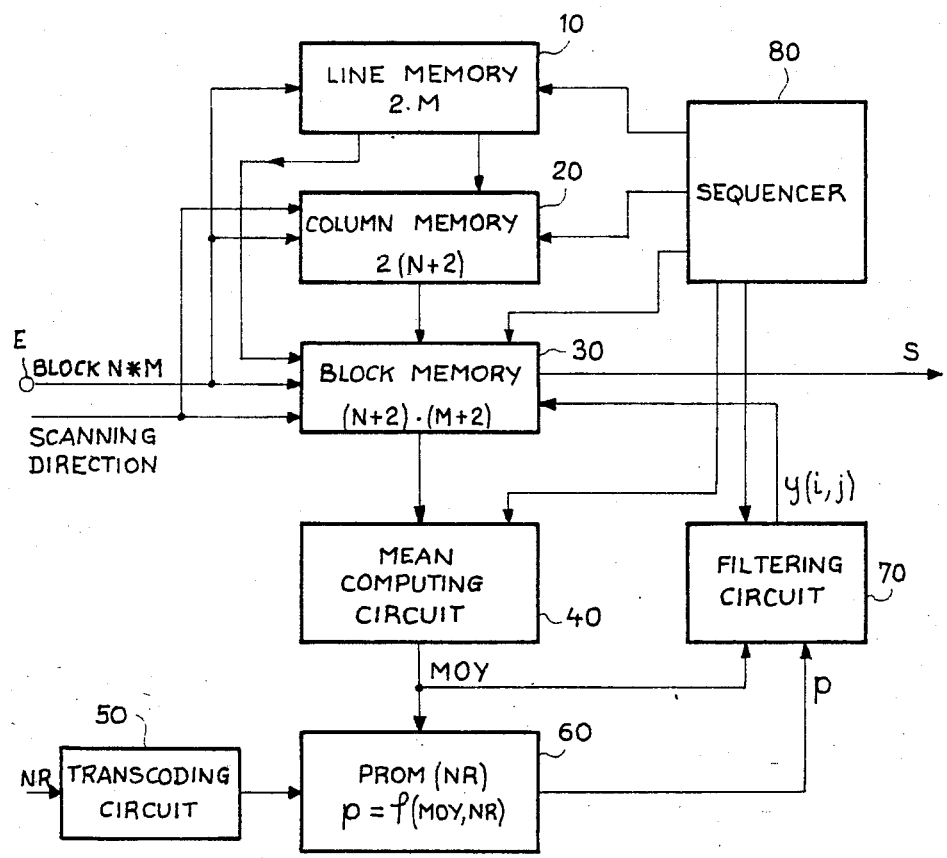
FIG_5

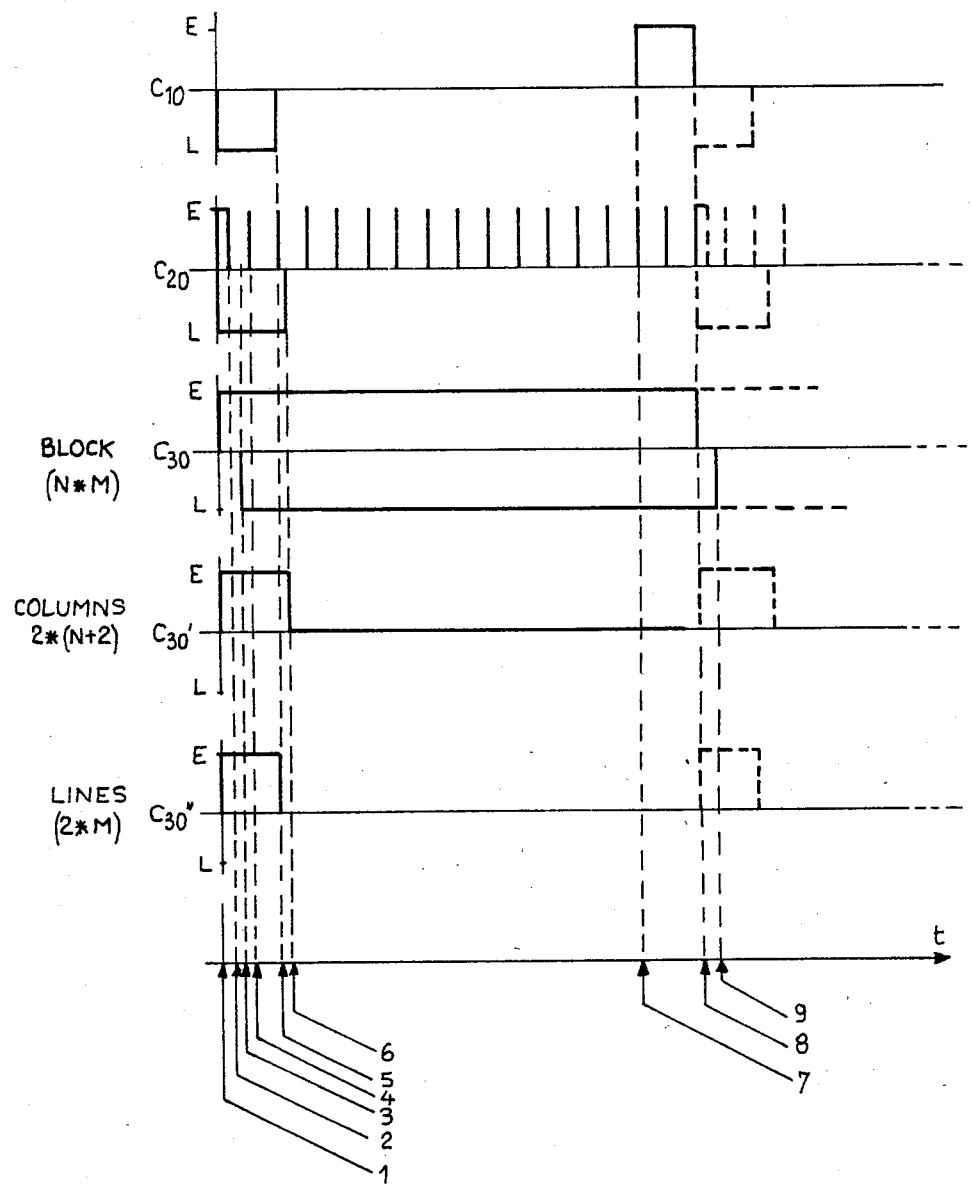
FIG_6

METHOD AND DEVICE FOR THE REDUCTION OF NOISE GENERATED BY A DIGITAL IMAGE ENCODER/DECODER OPERATING BY BLOCKS

BACKGROUND OF THE INVENTION

1. Field of the Invention

The present invention relates to the processing of digitized images and especially to systems designed to reduce the throughput of digital data needed for the storage or transmission of these images.

The encoding of color digital images at a low throughput rate requires a high data reduction ratio: for example, if a throughput rate of 10 M bits per second is sought, for a digital image source delivering data at 140 m bits per second, the data reduction rate is then 14.

2. Description of the Prior Art

A known method uses an encoder/decoder that performs an orthogonal transformation to obtain compression rates of this type. But a compression rate of this type creates faults in the images in certain circumstances.

These faults may be the following:

the boundaries of the blocks become visible in the uniform zones of the image;

visible oscillations occur at sharp, isolated transitions;

faults in restitution of data also become visible in the dark zones of the image.

An object of the invention is a method and corresponding device to reduce these faults through a filtering of blocks of images, adapted to the encoding conditions.

SUMMARY OF THE INVENTION

According to the invention, a method for the reduction of noise generated by an encoding/decoding of digital images, operating by blocks of pixels or points, comprises the processing of the characteristic value of the current point of the decoded blocks;

by determining, from a window centered on the current point of the image, a mean characteristic value Moy, and then determining a filtering parameter p from a parameter, NR, related to the operating status of the encoder and this mean, Moy;

and by determining a filtered value, $y(i,j)$, for the current point from its decoded characteristic value $x(i,j)$, of the filtering parameter p, and the mean in the window, Moy: $y(i,j) = p \cdot x((i,j)) + (1-p) \cdot Moy$.

Another object of the invention is a device for the reduction of noise generated by an encoding/decoding device, operating by blocks of digitized pixels of N lines by M columns having an input (E) connected to the output of the decoder and designed for the implementation of the method wherein:

this input (E) is connected to the input of a line memory with a capacity equal to 2M values, the input of a column memory with a capacity equal to 2 columns of $2(N+2)$ values and to the input of a working memory with a capacity equal to $(N+2)(M+2)$ values, said memory being also connected to the line and column memories, the device further comprising a circuit to compute the mean from values associated with the points of a window stored in the memory;

a circuit to determine the filter parameter, p, coupled firstly to the mean computing output and, secondly, to an input of characteristic data on the operating status of the encoder;

and a filtering circuit connected firstly to the output of the mean computing circuit and, secondly, to the output of the circuit for determining the filtering parameter, the output of said filtering circuit giving the sequence of filtered characteristic values.

BRIEF DESCRIPTION OF THE DRAWINGS

The invention will be better understood and other characteristics will appear from the following description, made with reference to the appended drawings, of which:

FIG. 1 shows the variations of the filtering parameter as a function of the mean in the filtering window;

FIG. 2 shows the scanning of the image by blocks;

FIGS. 3 and 4 illustrate the movement of the filtering window in a scanned block, from right to left and left to right respectively;

FIG. 5 is a block diagram of the noise reducing device according to the invention;

FIG. 6 illustrates the sequencing of the handling of the memories 10, 20 and 30 of FIG. 5.

DESCRIPTION OF THE PREFERRED EMBODIMENT

The encoding, after the orthogonal transformation of the blocks of images, amounts, very briefly, to selecting a portion, of variable size, of the spectral components of each transformed block, depending on the number of components resulting from the transformation, in order to store or transmit these components. The number of components chosen is a function of the operating status of the encoder, namely, it is a function of the regulation of the throughput. The element designed to regulate the throughput contains a buffer memory which may alternatively get empty or get filled. If the buffer memory is overfull, it then becomes necessary then to reduce the number of encoded components to lower the level to which the memory is filled. At any instant, the filling of the buffer memory may be quantified by a status variable, NR, characteristic of the operating status of the encoder/decoder. When the buffer memory is scarcely filled, NR is the low value and all the components resulting from the orthogonal transformation can be transmitted, whereas when the buffer memory is completely filled, NR has a high value and the number of components transmitted should be reduced by regulation.

The regulating element therefore takes a decision, at any instant, on the number of components to be encoded in each of the blocks. Now the number of components that will be needed for the proper restitution of the block depends on the data initially contained in this block, and the regulating element does not take this into account. This state of affairs is the main source of faults caused by the encoder/decoder in the restored images.

According to the invention, these faults are reduced by an adaptive filtering of the image blocks. This filtering takes into account, firstly, the average local luminance value and, secondly, the regulation parameter NR. Furthermore, to cope with the data restitution faults in the dark zones of the image, it is important to preserve the possibility of encoding the delicate details in these dark zones when the value of the regulation parameter allows it.

The following precise description of the noise reducing method according to the invention is given for the filtering of luminance where the faults are most sensitive. But this description is not restrictive and the same method can also be applied to chrominance components.

Let $x(i,j)$ be the value of the luminance of a digitized pixel restored by the decoder of an encoding/decoding system for television signals operating by non-filtered blocks, namely before the processing of the invention.

Let $y(i,j)$ be the luminance value of the pixel of the filtered image according to the invention.

Let Moy be the mean of the luminance levels of the pixels in a neighborhood centered on the pixel of the line i and the column j. This window may have a dimension of $3 \times 3$ as defined below:

| $x(i-1, j-1)$ | $x(i-1, j)$ | $x(i-1, j+1)$ |
|---|---|---|
| $x(i, j-1)$ | $x(i, j)$ | $x(i, j+1)$ |
| $x(i-1, j-1)$ | $x(i+1, j)$ | $x(i+1, j+1)$ |

In this case, the mean of the luminance in this window $$Moy = 1/9 \, \Sigma \, x(i+k, j+l)$$
for $k = \{-1, 0, +1\}$
and $l = \{-1, 0, +1\}$ With the filtering parameter p determined as indicated below, the filtering used according to the invention has the form:

$$y(i,j) = p.x(i,j) + (1-p).Moy$$

The formula shows that if $p=1$, then $y(i,j)=x(i,j)$: the value of the decoded luminance is transmitted as such. On the contrary, if $p=0$, then $y(i,j)=Moy$: the filtered value no longer depends on the encoded value of the luminance of the pixel except by the mean in the window.

This value of p is chosen, firstly, as a function of the mean value in the window Moy and, secondly, as a function of the regulation parameter NR. The function of two variables, NR and Moy, from which the value of p, used for the filtering, is determined, is related to the psycho-visual aspect of the images. For example, it has been shown that a function of the type:

$$p = (1 + (\sqrt{2}-1).(Log(NR+1) \, a/Moy)^b )^{-2}$$

gives good results. a and b are constants of empirical values determined as indicated above according to the psycho-visual aspect of the images after processing. For example, a may be equal to 110 and b may be equal to 6. Depending on the values of NR and Moy, different values of p are obtained. FIG. 1 shows the variation of p as a function of the mean value, Moy, in the window according to different values of NR and with constant values indicated below: $b=6$ and $a=110$. The value of the constant b affects the slope of the curve $p=f(NR, Moy)$, while the constant determines, for a given value NR, the value of Moy for which $p=0.5$. This curve shows that for a given value of the local mean, Moy, the value p diminishes when the parameter NR increases. This was the goal sought, namely to reduce the influence of the transitions by more intensive filtering when the buffer memory is saturated.

In fact, within the framework of an embodiment, the value of the regulation parameter NR should be quantified so as to use different characteristics p(Moy), i.e. different programmed memories accessible through the value of the mean for a given value of the status variable. It is possible, for example, to quantify the regulation variable according to 9 levels: 0, 0.5, 1, 2, 3, 4, 5, 7, 10. The device then has nine PROMs which are accessible depending on the different values of the mean, the address of the PROM, NPROM being obtained by a transcoding table for example:

| NR | 0 | 0.5 | 1 | 2 | 3 | 4 | 5 | 7 | 10 |
|---|---|---|---|---|---|---|---|---|---|
| NPROM | 1 | 2 | 3 | 4 | 5 | 6 | 7 | 8 | 9 |

The filtering is done as follows: since the processing by blocks is done by orthogonal transformation, the image being sub-divided into encoding blocks considered independently of one another for this orthogonal transformation, the filtering of the invention is done by frames in such a way that the analysis is done along bands of a height equal to that of the block and of a length equal to the length of a line, the last block of the line being immediately followed, for the filtering operation, by the analysis of the block of the following band immediately below, i.e. the scanning direction is changed from one band to the following one. FIG. 2 shows the order in which the encoding blocks are analyzed for the filtering operation: the blocks are bands of odd-numbered rows analyzed from left to right, and the blocks of bands of even-numbered rows are analyzed from right to left.

To erase, as far as possible, the boundaries between the encoding blocks, it is necessary to take into account decoded values allocated to the pixels of neighbouring blocks. Typically, an analysis using a $3 \times 3$ window will take into account the pixels of the last two lines of the block of the same row of the preceding band and the pixels of the last two columns (in the scanning direction of the current block) preceding the same band as well as the values of the four pixels adjoining these two lines and two columns in the block before the preceding band, namely "the diagonal block".

As indicated above, in each block, the filtering is done using a sliding window with a dimension of $3 \times 3$ for example. It therefore becomes necessary to have, in addition to a memory for the current block to be filtered, a line memory and a column memory, i.e. from right to left according to the scanning direction in the band.

The points needed for the processing according to the invention, for encoding by blocks of $16 \times 16$ pixels, are marked on FIGS. 3 and 4 respectively with a direction of analysis of the image by blocks, from right to left in FIG. 4 and from left to right in FIG. 4. In FIGS. 3 and 4, the pixels marked with a dot are those belonging to the current block while those marked with a "+" are points memorized in the lines memories, and those marked with a "x" are the points belonging to the column memory. The unbroken line marks the limit of a current block. The values memorized in the line memories come from the last two lines of the block above the current block. The points marked with "x" come, firstly, from the block adjacent to the same previously encoded band and, secondly, from the block of the previous band belonging to a lower row, namely from the block of the upper right hand or upper left hand diagonal depending on the direction in which the frame is analyzed. As and when the filtering window moves, the various points of the block are filtered. As an example, the filtering window has been shown in each of the FIGS. 3 and 4 at two particular moments. The central point of the filtering window is the filtered point at the instant when the window is in this position. It is identified by hachured lines.

With the conventions indicated above, the filtered block does not coincide exactly with the encoding blocks: the limits of the filtered block are marked with dashes in FIGS. 3 and 4. The above-mentioned processing method can be modified slightly to make the filtered block coincide with the encoding block. For this, since the processed block has a dimension of 18 points×18 points for an encoding block with a dimension of 16×16, the processing is then done as follows:

$$y(i,j) = x(i+1, J+1).p + (1-p).Moy$$

This formula is valid for blocks belonging to bands from right to left. For strips scanned from right to left, the formula is as follows:

$$y((i,j) = x(i-1, j-1).p + (1-p) Moy$$

Thus, the 16×16 points filtered block has its first upper left-hand point in the row i line, and the row j column equals one.

FIG. 5 is a block diagram of the noise reducing device according to the invention.

It has a data input E receiving the sequence of data from the decoded block, with dimensions of N lines and M columns. This input is connected, firstly, to a lines memory 10 designed for the memorizing of the two lower lines of the decoded blocks; this memory has a capacity of two image lines. The data input E is also connected to the input of a columns memory 20 designed to memorize, for each decoded block, the first two columns of the preceding block of the same line and the four points of the corner of the diagonal block as indicated above. This memory has a capacity of 2(N+2). The device further comprises a working memory 30, with a capacity of (N+2).(M+2) points designed to receive, firstly, the points of the current block, namely the N×M points and, secondly, the points memorized in the lines memory 10 and the column s memory 20. For this, the block memory 30 has three inputs respectively connected to the output of the lines memory 10, the output of the columns memory 20 and the data input E. It also has an input where it has, applied to it, a signal that indicates the scanning direction, and another input designed to give the filtered values corresponding to the different points which are registered, as and when the operation advances, in the place of the initial values.

For the filtering operation, the block memory 30 has an output connected to the input of a circuit 40 for computing the mean in a 3×3 (for example) sliding window, said circuit computing the mean value Moy from values in each window. This mean value is applied to the input of a PROM memory 60 which contains, for the different possible values of NR, a sequence of values associated with the different possible values of the mean. For this, the parameter NR is applied to the input of a transcoding circuit 50 which quantifies it. The quantified value constitutes a part of the address of the PROM 60, the other part of the address being the value of the mean Moy. Depending on the quantified regulation parameter NR and the mean, the PROM memory 60 gives the value of the parameter p which will then be used for the filtering. This value of p is applied to an input of a filtering circuit 70, the other input of which is connected to the output of the mean computing circuit 40 and which computes the filtered value for the current point y(i,j). This filtered value is applied to the block memory 30 where it replaces the initial decoded value to within one shift. The memory of the block 30 has a data output S which gives the sequence of filtered values.

This mean value Moy is applied to the input of an PROM memory 60 which contains, for the different possible values of NR, a sequence of values associated with the different possible values of the mean. For this, the parameter NR is applied to the input of a transcoding circuit 50 which quantifies it. The quantified value is a part of the address of the PROM 60, the other part of the address being the value of the mean Moy. Depending on the quantified control parameter NR and on the mean, the PROM 60 delivers the value of the parameter p which will then be used for the filtering. This value of p is applied to an input of a filtering circuit 70, the other input of which is connected to the output of the mean computing circuit 40 and which computes the filtered value for the current point y(imj). This filtered value is applied to the block memory 30 where it replaces the initial decoded value to within one shift. The block memory 30 has a data output S which gives the sequence of the filtered values.

The various circuits described above are controlled by a sequencing circuit 80. This sequencer has the special function of handling the memories 10, 20 and 30 of FIG. 5 illustrated by the timing diagrams of FIG. 6.

In this figure, E designates the instants during which writing is done in a memory and L designates the instants at which the memories are read. $C_{10}$ is the timing diagram of the actions of reading and writing, in the memory 10, of the two upper lines, $C_{20}$ is the timing diagram of the reading and writing actions in the memory 20, of the two preceding lateral columns, plus the four points belonging to the upper diagonal block (to the left or right depending on the scannings of the blocks).

The writing in the block memory 30 is processed in three relative stages:

at the main block of a size N * M $C_{30'}$
at the lateral columns $C_{30'}$
at the two upper lines $C_{30''}$ The key processing stages are marked t1 to t9 on the lower timing diagram of FIG. 6. These different stages are the following:

at the instant t1:
writing of the first points of the decoded block in the memory 30,
writing of the points of the upper lines in the memory 30 ($C_{30'}$), hence reading of the memory 20,
writing of the points of the columns in the memory 30 ($C_{30''}$), hence reading of the memory 20,
writing in the memory 20 of the four upper diagonal points taken in the memory 10 (for the processing of the following block);
at t2: end of writing of the diagonal points in the memory 20;
at t3: start of filtering and then start of reading of the memory zone 30 (filtered points);
at t4: writing in the memory 20 of the two end points of the block lines corresponding to the column points intended for the following block, said writing being done as many times as there are lines in the block;

at t5: end of the reading of the upper line points in the memory 10 and end of writing in the memory 30 ($C_{30''}$);

at t6: end of reading of the points of the columns in the memory 20 and writing in the memory 30 ($C_{30''}$);

at t7: arrival at the two last lines of the block; these lines are memorized in the memory 10 at the same time as in the memory 30;

at t8, which marks the end of the current block being written in the memory 30, all the procedures presented during the t1 stage are started again (dashes);

at t9: end of processing of current block.

The invention is not restricted to the embodiments described above nor to the digital values given as examples. In particular the window used to calculate the mean could be bigger and could, for example, have $5 \times 5$ points, the current point being the central point of this window. Furthermore, the arrangement wherein the regulation parameter NR values are quantified so as to find, from the mean value and this quantified regulation parameter, the parameter value p is not a restrictive arrangement. Any arrangement which enables the determining of a parameter p from these two values can be used.

The invention can be applied especially to the restitution of images in digital video tape-recorders.

What is claimed is:

1. A method for the reduction of noise generated by an encoding/decoding of digital images, operating by blocks of pixels, said method comprising the processing of the characteristic value of the current point of the decoded blocks;

by determining, from a window centered on the current point of an image, a mean characteristic value Moy, and then determining a filtering parameter p from a parameter NR, related to the operating status of an encoder and said mean characteristic value Moy;

and by determining a filtered value, y(i,j), for the current point from its decoded characteristic value x(i,j), of the filtering parameter p, and of said mean characteristic value Moy: $y(i,j) = p \times c((i,j) + (1-p) \cdot Moy$.

2. A method according to claim 1 wherein the filtering parameter p is close to 0, when said mean characteristic value Moy is low, and wherein the filtering parameter p is equal to 1 when said mean characteristic value Moy is high.

3. A method according to either of the claims 1 or 2 wherein the parameter NR related to the operating status of the encoder, is related to the level at which a buffer memory, which stores a plurality of encoded components before transmission, is filled, the filtering parameter p=1 when the buffer memory is scarcely filled and becomes greater when the buffer memory gets entirely filled.

4. A method according to claim 3, wherein the filtering parameter p varies as a function of said mean characteristic value Moy and of the parameter NR according to the following function:

$$p = |(1 + \sqrt{2-1}) \cdot (Log(NR + 1) a/Moy)^b)|^{-2}$$

where a and b are two constants with predefined values.

5. A method according to claim 1 wherein the characteristic values associated with the blocks of pixels are digitized luminance values.

6. A device for the reduction of noise generated by an encoding/decoding device, operating by blocks of digitized pixels of N lines by M columns, having an input connected to the output of the decoding device and designed for the implementation of the method according to claim 1 wherein:

said input is connected to the input of a line memory with a capacity equal to 2M values, the input of a column memory with a capacity equal to 2 columns of 2(N+2) values and to the input of a working memory with a capacity equal to (N+2) (M+2) values, said working memory being also connected to the line and column memories, the device further comprising a circuit to compute said mean characteristic value Moy from values associated with the points of a window stored in said working memory;

a circuit to determine the filtering parameter p, coupled firstly to the mean computing output and, secondly, to an input of characteristic data on the operating status of the encoder;

and a filtering circuit connected firstly to the output of the mean computing circuit and, secondly, to the output of the circuit for determining the filtering parameter, the output of said filtering circuit giving the sequence of filtered characteristic values.

7. A device according to claim 6 wherein, the operating status of the encoder being characterized by the parameter NR related to the level at which a memory in the encoder is filled, the device further comprises a transcoding circuit which receives the parameter NR and gives data constituting a part of an address of an PROM memory forming circuit for determining the filtering parameter p, said mean characteristic value Moy constituting another part of the address.

* * * * *